United States Patent
Eliyahu et al.

(10) Patent No.: US 10,848,491 B2
(45) Date of Patent: Nov. 24, 2020

(54) AUTOMATICALLY DETECTING A VIOLATION IN A PRIVILEGED ACCESS SESSION

(71) Applicant: CyberArk Software Ltd., Petach-Tikva (IL)

(72) Inventors: Sagi Eliyahu, Tel Aviv (IL); Millie Richter, Petach-Tikva (IL)

(73) Assignee: Cyberark Software Ltd., Petach-Tikva (IL)

( * ) Notice: Subject to any disclaimer, the term of this patent is extended or adjusted under 35 U.S.C. 154(b) by 9 days.

(21) Appl. No.: 15/873,924

(22) Filed: Jan. 18, 2018

(65) Prior Publication Data

US 2019/0222577 A1 Jul. 18, 2019

(51) Int. Cl.
*H04L 29/06* (2006.01)
*H04L 12/24* (2006.01)
*H04L 29/08* (2006.01)
*G06F 11/34* (2006.01)

(52) U.S. Cl.
CPC .......... *H04L 63/10* (2013.01); *G06F 11/3495* (2013.01); *H04L 41/5054* (2013.01); *H04L 41/5074* (2013.01); *H04L 65/1066* (2013.01); *H04L 67/14* (2013.01); *H04L 67/32* (2013.01); *H04L 63/20* (2013.01)

(58) Field of Classification Search
CPC . H04L 63/10; H04L 41/5054; H04L 65/1066; G06F 11/3495
USPC ........................................................ 709/224
See application file for complete search history.

(56) References Cited

U.S. PATENT DOCUMENTS

| | | | |
|---|---|---|---|
| 2006/0143688 A1* | 6/2006 | Futoransky | H04L 63/102 726/1 |
| 2007/0192474 A1* | 8/2007 | Decasper | H04L 67/306 709/223 |
| 2008/0034425 A1* | 2/2008 | Overcash | G06F 21/55 726/22 |
| 2008/0072311 A1* | 3/2008 | Mullick | H04L 63/0272 726/15 |
| 2016/0014077 A1* | 1/2016 | Plotnik | G06F 21/554 726/11 |
| 2016/0125522 A1* | 5/2016 | Tang | G06Q 40/00 705/35 |
| 2016/0330220 A1* | 11/2016 | Dulkin | H04L 63/102 |
| 2018/0260242 A1* | 9/2018 | Ahmed | G06F 11/3006 |
| 2018/0288026 A1* | 10/2018 | Callaghan | H04L 63/08 |

\* cited by examiner

*Primary Examiner* — Meng Vang
(74) *Attorney, Agent, or Firm* — Finnegan, Henderson, Farabow, Garrett & Dunner, LLP (57) ABSTRACT

Disclosed embodiments include securing privileged access communication with target systems. Techniques include identifying a request for access to a target resource by an identity, the request being associated with a requested activity that requires privileged access, identifying a connection session in which the identity communicates with the target resource, automatically analyzing an actual activity of the identity occurring in the connection session, automatically comparing the actual activity to the requested activity to determine whether the actual activity complies with the requested activity, and automatically detecting, based on the determination, an inconsistency between the actual activity of the identity and the requested activity associated with the request for access.

27 Claims, 5 Drawing Sheets

| Category | Subcategory |
|---|---|
| Request | Password Reset |
| | Password Expired |
| | Account Locked |
| Inquiry / Help | Anti-Virus |
| | Email |
| Software | Internal Application |
| | Email |
| | Operating System |
| Hardware | CPU |
| | Disk |
| | Keyboard |
| | Memory |
| | Monitor |
| | Mouse |
| Network | DHCP |
| | DNS |
| | IP Address |
| | VPN |
| | Wireless |
| Database | DB2 |
| | MS SLQ Server |
| | Oracle |

AUTOMATICALLY DETECTING A VIOLATION IN A PRIVILEGED ACCESS SESSION

BACKGROUND

Ticketing systems are used to create tickets for users or other identities to engage in privileged sessions and communicate with target systems. For example, when a network server is down, a ticket may be created for IT personnel to conduct the needed servicing. Tickets usually specify the particular actions that are requested to be performed by the personnel during a connection session.

Nevertheless, there is no efficient way for detecting inconsistencies between the specified actions for which the ticket was requested or granted and the actual activity that eventually took place during the session.

Depending on the size of an organization or other system environment, the number of sessions to account for can present a formidable challenge with inefficient techniques that attempt to manually or individually review audit information from individual sessions. One approach that is used involves monitoring sessions and then manually reviewing each session's audit data, in attempt to find inconsistencies with the ticket and what actually happened within a session. Not only are such techniques time- and resource-intensive, but also they are prone to missing suspicious activity that has occurred and incorrectly labeling benign activity as malicious.

Therefore, technological solutions are needed to address these problems and inefficiencies. In particular, technological solutions are needed for automatically and efficiently analyzing privileged session activity to determine whether it conflicts with the requested activities associated with a ticket. Further, technological solutions are needed for taking remedial action when inconsistencies or anomalies are detected.

SUMMARY

The disclosed embodiments describe non-transitory computer readable media and methods for detecting inconsistencies of activities occurring over a connection session. For example, in an exemplary embodiment, there may be a non-transitory computer readable medium including instructions that, when executed by at least one processor, cause the at least one processor to perform operations for identifying a request for access to a target resource by an identity, the request being associated with a requested activity that requires privileged access; identifying a connection session in which the identity communicates with the target resource; automatically analyzing an actual activity of the identity occurring in the connection session; automatically comparing the actual activity to the requested activity to determine whether the actual activity complies with the requested activity; and automatically detecting, based on the determination, an inconsistency between the actual activity of the identity and the requested activity associated with the request for access.

According to a disclosed embodiment, information regarding the requested activity is specified in the request for access.

According to a disclosed embodiment, information regarding the requested activity is received via further communication with the identity.

According to a disclosed embodiment, the operations further comprise performing a remediation operation based on the automatically detected inconsistency.

According to a disclosed embodiment, the remediation operation includes at least one of: triggering an alert identifying the actual activity; performing a control operation regarding the actual activity; restricting the connection session; and restricting the privileged access.

According to a disclosed embodiment, the remediation operation includes invoking an investigation operation with respect to at least one of the privileged access and the identity.

According to a disclosed embodiment, the remediation operation includes rotating a password associated with at least one of the identity and the target resource.

According to a disclosed embodiment, the operations further comprise obtaining data indicative of the requested activity that requires the privileged access.

According to a disclosed embodiment, the operations further comprise establishing the connection session with the target resource.

According to a disclosed embodiment, the operations further comprise granting the privileged access over the connection session to the target resource.

According to a disclosed embodiment, the operations further comprise determining whether the inconsistency includes an indicia of a potentially malicious activity.

According to a disclosed embodiment, the request for access is associated with a ticket issued by a ticketing system associated with the target resource, wherein the ticket relates to the requested activity.

According to a disclosed embodiment, the requested activity is indicative of at least one of a reason for the request for access; a requested type of operation at the target resource; an identity of a requested service associated with the target resource; and an identity of a required hardware component associated with the target resource.

According to a disclosed embodiment, the automatically analyzing is performed at a different location than the target resource.

According to another disclosed embodiment, a method may be implemented for detecting inconsistencies of activities occurring over a connection session. The method may comprise identifying a request for access to a target resource by an identity, the request being associated with a requested activity that requires privileged access; identifying a connection session in which the identity communicates with the target resource; automatically analyzing an actual activity of the identity occurring in the connection session; automatically comparing the actual activity to the requested activity to determine whether the actual activity complies with the requested activity; and automatically detecting, based on the determination, an inconsistency between the actual activity of the identity and the requested activity associated with the request for access.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 2 is an example screenshot of an interface through which the user may identify an incident in accordance with disclosed embodiments.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

Reference will now be made in detail to the disclosed embodiments, examples of which are illustrated in the accompanying drawings.

As disclosed herein, computer or network identities may attempt to communicate with target resources. An identity may be, for example, a local account on a computer or computer system. The account may be established according to a particular operating system (e.g., Microsoft Windows®, Mac OS®, UNIX, etc.), a particular security service, or another service or protocol governing the computer or computer system. An identity may also be a network account. Such an identity may be established according to a network operating system (e.g., a Microsoft® network operating system, a Cisco® network operating system, a Dell® network operating system, a Linux network operating system, etc.). Further, network account identities may be established based on network security protocols or services. In addition, an identity may be an instance of a virtual machine or container running in a cloud computing environment. The identity may also be a token used to identify a particular computing resource, person, account, virtual machine, container, or other entity accessing a computer or network.

In the disclosed embodiments, a target resource may be configured for communication with computer or network identities. As disclosed herein, a target resource may be any of numerous types of devices with data processing and network communications capabilities to which access may or may not be restricted. Examples include servers, desktop computers, cloud-computing virtual machines or containers, laptops, smartphones, tablets, personal digital assistants, enterprise digital assistants, smart cards, smart watches, smart bands, smart headphones, computer-embedded clothing, car-computers and other in-vehicle computer equipment, Internet-of-Things (IoT) devices, and any other device with data processing and network connectivity capabilities.

Target resources may, in some embodiments, be access-restricted, or privileged, network resources. Accordingly, target resources may be network resources to which access is limited, such as through a requirement that some privileged credential (e.g., password, SSH key, symmetric (e.g., public/private) key, or other type of cryptographic data or privileged access token) be provided and verified before access to the target resource is permitted. Accordingly, privileged access, as used herein, refers to one or more of these types of access restrictions. The connections or sessions between identities and target resources may be implemented through a variety of techniques, such as secure protocols (e.g., Secure Shell (SSH)), secure tunnels (e.g., SSH tunnels), virtual private networks (VPNs), and remote desktop protocol (RDP) connections, among other protocols and connection techniques.

Figure 1:
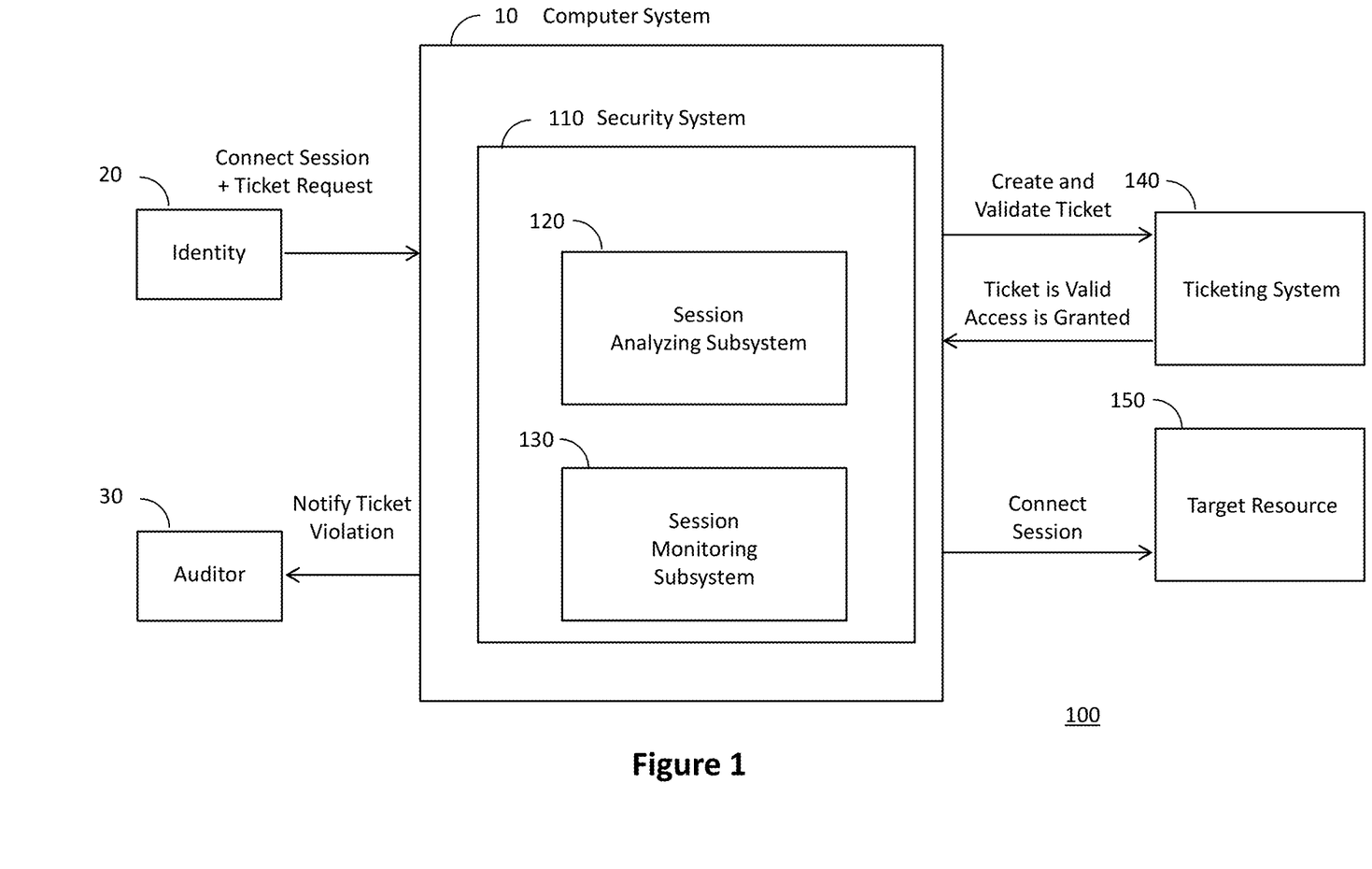
FIG. 1 is a block diagram of an example system in accordance with disclosed embodiments.

FIG. 1 is a block diagram illustrating exemplary architecture of a system 100 in accordance with disclosed embodiments. System 100 may include a security system 110 implemented by a computer system 10. Computer system 10 may include one or more dedicated processing units, application-specific integrated circuits (ASICs), field-programmable gate arrays (FPGAs), or various other types of processors or processing units coupled with at least one non-transitory processor-readable memory configured for storing processor-executable code. When the processor-executable code is executed by a processor, the processor may carry out instructions in response to various types of requests received via identity 20, auditor 30, session analyzing subsystem 120, session monitoring subsystem 130, ticketing system 140, or target resource 150. In other embodiments, each of identity 20, auditor 30, session analyzing subsystem 120, session monitoring subsystem 130, ticketing system 140, or target resource 150 has its own dedicated processor and memory. Further, each of computer system 10, identity 20, auditor 30, security system 110, session analyzing subsystem 120, session monitoring subsystem 130, ticketing system 140, and target resource 150 may be in the same network (e.g., an on-premises network, private cloud network, public cloud network, hybrid private/public cloud network, etc.) or in one or more different networks.

Security system 110 may include a session analyzing subsystem 120 and a session monitoring subsystem 130. As discussed further below, session analyzing subsystem 120 and session monitoring subsystem 130 may function to analyze aspects of communication sessions in which identity 20 participates, either in real-time or historically, and determine whether anomalies or inconsistencies exist in such sessions.

Security system 110 may also be in communication with ticketing system 140 and further in communication with target resource 150. In some embodiments, ticketing system 140 may be configured to handle IT service requests or other requests for access to network resources, such as target resource 150. Ticketing system 140 may function to issue session tickets to identity 20. For example, in an IT (information technology) system environment, ticketing system 140 may be part of a system that provides IT support services in the event of network incidents (e.g., equipment failures, malfunctions, upgrades, patches, fixes, troubleshooting, or other situations where assistance is needed). An example of such an IT service is ServiceNow™ which, as discussed further below in connection with FIG. 2, allows IT personnel to capture incidents through a self-service portal, as well as perform functions such as chat, email, phone calls. The portal may also display incoming events and prioritize them based on agreed service level targets. Incidents can be automatically routed to the appropriate resolution group, together with related information. Other examples of IT services include Freshservice™ incident management tool by BMC Software™, Web Help Desk Ticketing System™ software solution by Solarwinds, and Oracle Enterprise Manager™. Of course, ticketing system 140 may be implemented in a variety of different embodiments, and is not limited to IT service embodiments. In some embodiments, system 100 may include multiple ticketing systems 140 corresponding to one or more different ticketing environments.

In operation, security system 110 may be configured to receive a request for access to target resource 150 by identity 20. In some embodiments, the request may be associated with a specified activity that requires privileged access. For example, the request from identity 20 may specify a particular purpose or intended activity that identity 20 will perform in connection with target resource 150. The request from identity 20 may specifically be for a ticket from ticketing system 140, or may be a request to directly access target resource 150. In some embodiments, identity 20 may be authenticated by security system 110 before ticketing system 140 creates a ticket for use in a session between identity 20 and target resource 150. The ticket may, in some embodiments, reflect or be associated with the particular purpose or intended activity that identity 20 indicated it will perform in connection with target resource 150. In some embodiments, tickets are stored for review and analysis. For example, tickets may be stored at security system 110 or an external database. Further, in other embodiments the ticket may be used to establish a connection session between identity 20 and target resource 150. For example, a ticket may be expressed in or associated with an authentication token or credential. The ticket (or identity 20) may then be authenticated by security system 110. In accordance with the above embodiments, system 100 may be configurable for operation with one or many different sessions open concurrently between identities (e.g., identity 20) and target resources (e.g., target resource 150).

Session analyzing subsystem 120 and session monitoring subsystem 130 may be configured to automatically analyze actual activities of identity 20 occurring in the connection session, and automatically compare the actual activity to the requested activity (e.g., from the request for the ticket) to determine whether the actual activity complies with the requested activity. In some embodiments, for example, session analyzing subsystem 120 functions to determine the activities that identity 20 indicated it will perform in connection with target resource 150, while session monitoring system 130 functions to observe and analyze real-time or historical activity of identity 20 within a session. Other functions or combinations of functions are possible as well.

As an example, in some embodiments target resource 150 may be very sensitive. For example, target resource 150 may be a highly confidential internal server or database storing files or information regarding an organization's strategic business plans, financial forecasts, pharmaceutical compositions, manufacturing specifications, recipes, payroll information, or other trade secrets. An organization may set a policy (e.g., implemented by security system 110 or auditor 30) requiring that identity 20 must provide the exact set of commands they are planning to execute during a requested session with target resource 150. The commands may be identified by actual line-by-line programming commands, by categories of actions (e.g., copy, store, delete, overwrite, move, modify, execute, etc.), or by other descriptions. In some embodiments, such an identification of commands must be specified within the ticket request to ticketing system 140. In such embodiments, session analyzing subsystem 120 may be responsible for detecting the specific commands identity 20 indicates it wants to perform, and session monitoring subsystem 130 may be responsible for monitoring an actual session between identity 20 and target resource 150 to determine whether any other commands (or types of commands) are executed or requested. For example, if the request from identity 20 indicates a requested action of copying files, an inconsistency or anomaly may be identified if identity 20 requests to delete or modify files during a communication session with target resource 150. In some embodiments, session monitoring subsystem 130 may intercept communications between identity 20 and target resource 150 in order to monitor them. This may or may not involve capabilities to cache copies of the communications, log information about the communications, or block communications if deemed appropriate. In other embodiments, session monitoring subsystem 130 may receive real-time or historical reports of communications between identity 20 and target resource 150. In such embodiments, session monitoring subsystem 130 may similarly have the ability to cache copies of the communications, log information about the communications, or block communications.

In other embodiments, an organization's policy (e.g., implemented by security system 110) may require that identity 20 must identify specific servers, databases, or other network resources (e.g., target resource 150 or subsystems thereof) they wish to connect to. Alternatively, identity 20 may identify particular categories of target resources 150 it seeks to connect to (e.g., categorized by IP address, by administrator group, by privileged access level, by descriptive category (e.g., "human resources" or "engineering"), by geographical location, or by other categorizations). As discussed above, the identification of a particular target resource 150 or subsystem may be included in the request for a ticket sent to ticketing system 140. In some embodiments, session analyzing subsystem 120 may be responsible for determining the identified target resource 150 (or category thereof) specified by identity 20. Once a communication session between identity 20 and target resource 150 is established, communications within the session may be monitored by session monitoring subsystem 130. In some embodiments, as discussed above, this may involve intercepting communications between identity 20 and target resource 150. In other embodiments, it may involve receiving real-time or historical reports on such communications. If session monitoring subsystem 130 determines that the particular target resource 150 (or category thereof) specified by identity 20 is different from the network resource that identity 20 is actually seeking to connect to, an inconsistency or anomaly may be declared. For example, if identity 20 indicated in its request for a ticket that it intended to communicate with a particular SQL server, but session monitoring subsystem 130 detected that identity 20 was actually seeking to access a financial forecast database, session monitoring subsystem 130 may declare an inconsistency or anomaly. In other embodiments, such information is sent to auditor 30, which declares the inconsistency or anomaly.

As a further example, security system 100 may be configured to monitor specific types of network operations. For instance, identity 20 may be required in its request for a ticket from ticketing system 140 to identify what type of operations it plans to perform. Examples of types of operations may be modifying configuration files, performing system maintenance, updating user profiles, adding new network accounts, examining log files, instantiating new virtual machines or containers, updating a database, or various other types of activities. Similar to above embodiments, session analyzing subsystem 120 may be responsible for determining the types of network operations specified by identity 20 (e.g., in identity 20's request for a ticket from ticketing system 140). Once a communication session is open between identity 20 and target resource 150, session monitoring subsystem 130 may be responsible for monitoring communications in the session. As discussed above, this may involve intercepting communications or receiving real-time or historical reports of communications between identity 20 and target resource 150. If session monitoring subsystem 130 determines that identity 20 is seeking to perform operations at target resource 150 other than those specified in its request for a ticket, session monitoring subsystem 130 may declare an inconsistency or anomaly. For example, if identity 20 indicated in its request for a ticket that it sought to update human resources records, but session monitoring subsystem 130 determines that identity 20 is actually seeking to copy or download engineering specifications, session monitoring subsystem 130 may declare an inconsistency or anomaly.

As discussed below, exemplary uses of system 100 may include several steps or phases. Various steps or phases are discussed below in a particular order, although it should be understood that they may be practiced in a different order, or with fewer or additional steps or phases.

User Creates an Incident in the Service Management System

FIG. 2 is a screenshot illustrating an example interface on which a user may create an incident in accordance with various embodiments. As illustrated, screenshot 200 represents an incident-creation interface provided by Service-Now™ software, which provides service management software as a service. According to this example, the incident-creation interface may relate to IT services management, IT operations management, or IT business management. Of course, various other types of incident-creation interfaces are possible as well, including in fields other than IT or IT services.

When a user creates a new incident using an interface such as shown in screenshot 200, the user may specify one or many different parameters relating to the nature of the incident or the type of activity that the user intends to take to address the incident. As discussed above in connection with system 100, the user may be an identity 20, or may be an application or account associated with identity 20. Examples of parameters include the fields shown in the "Category," "Subcategory," "Scope," "Assignment group," "Assigned to," and "Type" portions of the interface. Some of parameters may be available for selection from a drop-down box, but an administrator of the system can also choose to create additional (e.g., customized) parameters. Once the user has identified the parameters associated with a particular incident, they may submit the information as part of a process of requesting a ticket to address the incident. In some embodiments, the ticket may include various types of information, such as an identifier (e.g., numerical, alphanumeric, etc.) identifying the ticket itself, identifying information about the incident, identifying the activity that the user indicated it wished to perform to address the incident, identifying the requesting user, and other types of information. As discussed above, some of this information may be specified in the parameters selected by the user.

Figure 3:
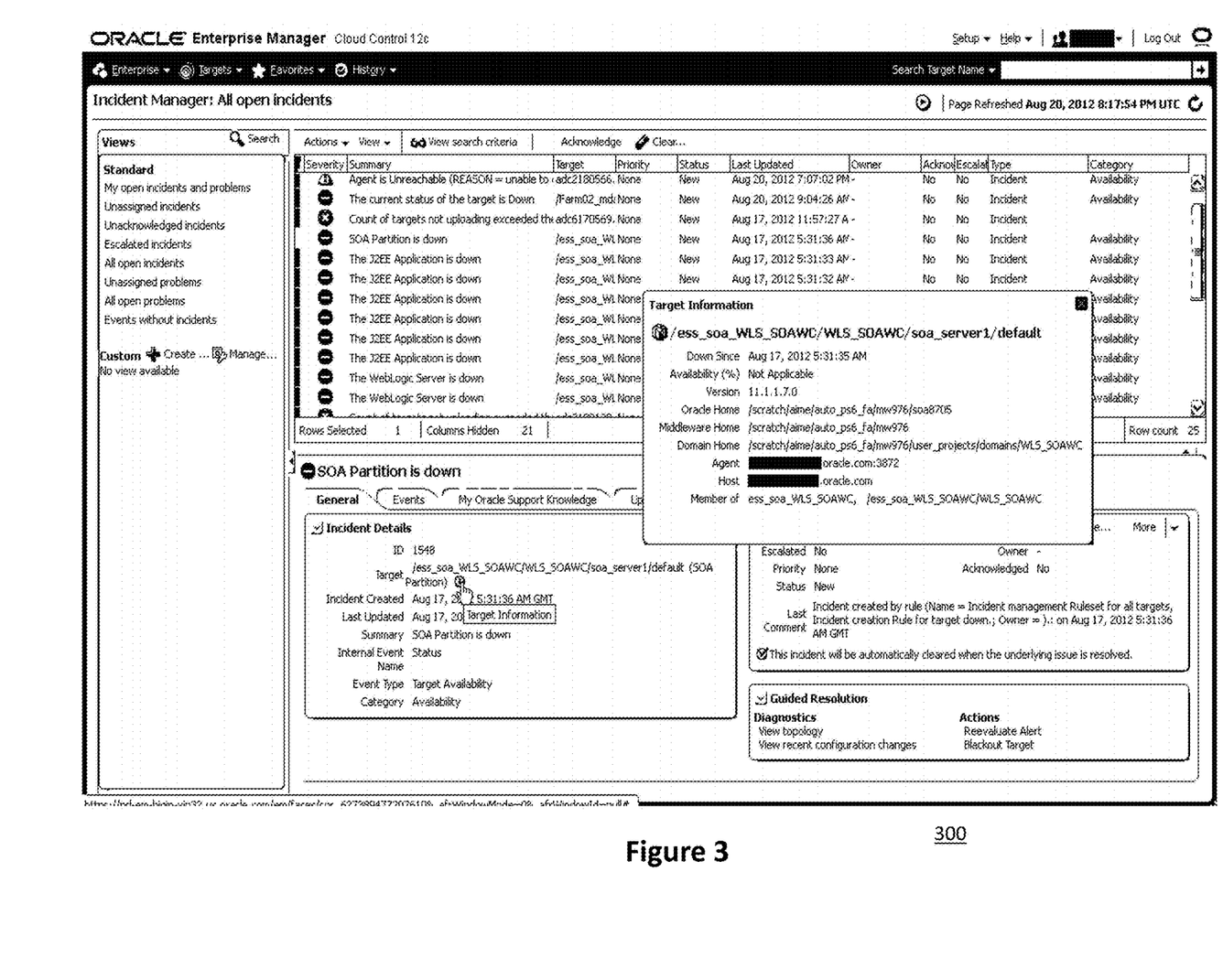
FIG. 3 is another example screenshot of an interface through which the user may identify an incident in accordance with disclosed embodiments.

FIG. 3 is a screenshot 300 illustrating another example interface for creating an incident. As shown in screenshot 300, the interface may correspond to software such as Oracle Enterprise Manager™. In this example, an incident may be created by the Oracle Enterprise Manager™ system for a specific target host which is down or malfunctioning. The "Target Information" contains details such as the actual address of the host, the time it went down or malfunctioned, its version, and network membership information for the host. As with the example interface from FIG. 2, the example interface in FIG. 3 may allow the user to submit the incident information as part of a process of requesting a ticket to address the incident. As noted above, the ticket may include various types of information, such as an identifier of the ticket itself, identifying information about the incident, identifying the activity that the user indicated it wished to perform to address the incident, and other types of information.

Identity Requests a Session Connection, Providing the Ticket Identifier

Once a ticket has been generated for an incident, a user such as IT personnel (e.g., identity 20 from system 100) may request a connection session to target resource 150. For example, the connection session can be initiated via a web UI from a web browser, an SSH prompt, a remote desktop (e.g., RDP) configuration, or various other ways. In some embodiments, the session connection is requested by the user without specifically including the ticket. For example, the ticket may be provided by the user in response to a separate request from security system 110. In other embodiments, the ticket is stored (e.g., in security system 110, or associated remote storage) and need not be provided directly by the user. In further embodiments, the user does directly provide the ticket as part of its request to connect to target resource 150.

Validation of the Ticket Identifier

As discussed above, before or after an identity (e.g., identity 20 in system 100) makes a request to connect to a target resource (e.g., target resource 150), the ticket may be validated. Regardless of the technique used to provide the ticket, in some embodiments the ticket identifier may be verified (e.g., by security system 110). For example, security system 110 may maintain a log of valid ticket identifiers that are provided from ticketing system 140. Thus, when a ticket is presented to security system 110, it may check the ticket identifier against the log to determine whether it is valid. In other embodiments, this ticket identifier validation process may be performed elsewhere, such as at a system remote from security system 110. The ticket generated by ticketing system 140 may, as discussed above, include a numerical, alphanumeric, or other type of identifier identifying the particular ticket. In some embodiments, the identifier is unique to the ticket and each ticket has a different identifier. After the ticket has been generated, in some embodiments the ticket itself (or a copy) is sent to security system 110 or an external storage database. Security system 110 (or the external database) may be configured to store the tickets for future (or real-time) analysis. Regardless of where the tickets are stored, they may be validated when an identity (e.g., identity 20) makes a request to communicate with a target resource (e.g., target resource 150). This may involve, for example, comparing the ticket identifier in the ticket with the corresponding ticket identifiers from the stored tickets.

Obtaining Incident Details

In accordance with above embodiments, once a ticket has been issued and, optionally, a validation of the ticket has occurred, incident details from the ticket may be obtained. For example, in system 100, session analyzing subsystem 120 may be responsible for obtaining details on the nature of a particular ticket or underlying incident. As discussed above, the ticket may specify certain activities that identity 20 has indicated it will perform in a connection session with target resource 150. Examples, as discussed above, include specific commands that identity 20 will perform, specific types of actions that identity 20 will perform, and specific resources that identity 20 will access. These various types of actions may be identified by identity 20, such as through the interfaces shown in FIGS. 2 and 3, above, and obtained by session analyzing subsystem 120. In some embodiments, session analyzing subsystem 120 maintains a local storage of such identified actions. In other embodiments, the identified actions are remotely stored but accessible to session analyzing subsystem 120. The stored identified actions may be associated with particular tickets by various fields or keys, such as the ticket identifier field.

Performing Session Audits for Communications Sessions

During a connection session between identity 20 and target resource 150, various different types of activities may occur or be requested. For example, either or both entities may attempt to read, write, overwrite, copy, download, modify, or otherwise access certain files from each other. Further, either or both entities may attempt to execute programs or scripts, or otherwise provide instructions, to each other. In addition, in some embodiments, while the connection session is open between identity 20 and target resource 150, one or both entities may attempt to communicate with other resources. For example, if identity 20 is an IT administrator connecting to target resource 150, which is an SQL database, identity 20 may concurrently attempt to connect to a confidential marketing database. In accordance with above embodiments, data regarding the actual or attempted activity in a communication session between identity 20 and target resource 150 may be monitored by session monitoring subsystem 130. For example, session monitoring subsystem 130 may be configured to intercept communications between identity 20 and target resource 150. It may do so, for example, if it is part of an intermediary system through which communications between identity 20 and target resource 150 flow. Further, in some embodiments, session monitoring subsystem 130 may be part of an application, agent, or plugin installed locally on identity 20 or on target resource 150. In such embodiments, the application, agent, or plugin may be configured to look analyze incoming communications and determine if they are coming from identity 20 or target resource 150. This may involve, for example, parsing incoming data packets, determining their IP address, and determining whether the IP address corresponds to identity 20 or target resource 150. In other embodiments, session monitoring subsystem 130 monitors communications activity between identity 20 and target resource without intercepting communications. For example, session monitoring subsystem 130 may obtain records of the communications from another system or component.

In some embodiments, session monitoring subsystem 130 is configured to monitor communications activity between identity 20 and target resource 150 in real-time. This may be done, for example, if the communications are intercepted in-real time, as discussed above. Further, real-time monitoring may be performed if session monitoring subsystem 130 is able to receive real-time (or close to real-time) records of such communications activities. For example, this may involve another system or component sending records of the communications activities to session monitoring subsystem 130. In other embodiments, session monitoring subsystem 130 is configured to monitor historical communications activity between identity 20 and target resource 150. For example, records of the communications may be stored in session analyzing subsystem 120 and made available to session monitoring subsystem 130 for analysis.

Detecting Violations by Comparing Actual Activity to Incident Details

There are various different methods which can be used to determine whether actual activity in a connection session between identity 20 and target resource 150 involves violations. As discussed above, this may involve comparing the actual activities observed by session monitoring subsystem 130 to the activities specified by an identity 20 when it requests a ticket from ticketing system 140, which are stored in session analyzing subsystem 120. Inconsistencies or anomalies between the actual and requested activity may be determined, as discussed above, in terms of the specific commands performed or requested by identity 20, the types of actions performed or requested by identity 20, or the locations that identity 20 is accessing or requesting to access.

The Inconsistencies or anomalies may also be determined by examining numerous session connection properties, such as the identification of identity 20 and their role (e.g., the role of identity 20 in a particular network or enterprise), the type of the connecting application being used by identity 20, historical network activity associated with identity 20, network activity that identity 20 engages in after a connection section with target resource 150 is complete, etc. Other examples include the type of target resource 150 which hosts the session (e.g., a particular database, application server, domain controller, etc.), the physical or logical location of that target resource 150, the timing of the session invocation (e.g., regular or irregular hours for connection), and various other properties. Further, the investigation for potential inconsistencies or anomalies may also involve monitoring identity 20's input devices such as the mouse and the keyboard (keystrokes logging and the like), monitoring outputs from the session (e.g., audio output, video output, etc.), analyzing actual events occurring in the session (e.g., identity 20 connecting to another machine, or processes and scripts executed within the session), performing live analysis on the actual frames or packets being sent back to identity 20 (e.g., in a remote desktop session), or using machine learning methods to detect patterns that will identify a specific type of activity in the connection session.

Figure 4:
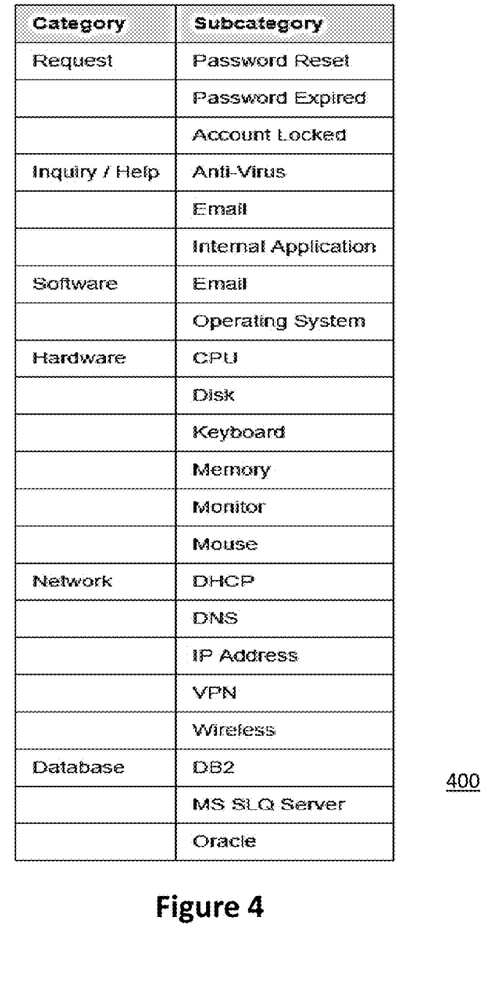
FIG. 4 is an example of a comparison table in accordance with disclosed embodiments.

FIG. 4 is an example of a table 400 in accordance with various embodiments. Table 400 may be used for performing comparisons between actual and identified connection session activities. A comparison may involve, for example, examining the "Category" and "Subcategory" that were provided by an identity 20 (e.g., IT administrator) during an incident creation process to the commands that were actually executed within the session. The Category and Subcategory parameters may come from the interfaces discussed above in connection with FIGS. 2 and 3, for example. Of course, various other types of parameters are possible as well, and may be included in varying versions of table 400.

As an example, if during the ticket request process the selected Category was "Network" and the selected Subcategory was "DNS," but in the actual session the commands were from the "Request" Category and "Password Reset" Subcategory, then an inconsistency or anomaly may be declared. In other words, a mismatch between a Category and/or a Subcategory may be determined, which may signal an inconsistency or anomaly in the communications session between identity 20 and network resource 150. In some embodiments, inconsistencies or anomalies may be detected within a particular Category as well. For example, if the request for a ticket identified the Category "Network" and the Subcategory "DNS," but the actual connection activity involved the Category "Network" and the Subcategory "VPN," that may be determined to be an inconsistency or anomaly. The particular deviation between identified activity and actual activity that is required before declaring an inconsistency or anomaly may be adjusted and customized as needed in different applications. The inconsistencies or anomalies may be determined and declared by security system 110 or by auditor 30.

Controlling the Session and Applying Remediation Operations

Once an inconsistency or anomaly in a communications session between identity 20 and target resource 150 has been identified, various control operations (e.g. remediation operations) may be applied in order to prevent or limit compromise to the target resource 150 or other network resources. These control operations may include, for example, restricting or limiting the session activity, closing the session, commencing monitoring of identity 20 or target resource 150, analyzing historical activity of identity 20, issuing an authentication or other security prompt to identity 20, rotating or invalidating a password or other authentication credential of identity 20, or various other types of remediation operations. In some embodiments, once an inconsistency or anomaly is detected (e.g., by security system 110), the inconsistency or anomaly is provided to auditor 30. Auditor 30 may then perform the remedial operations discussed above, or may just store data associated with the inconsistencies or anomalies for subsequent analysis or remedial actions.

Figure 5:
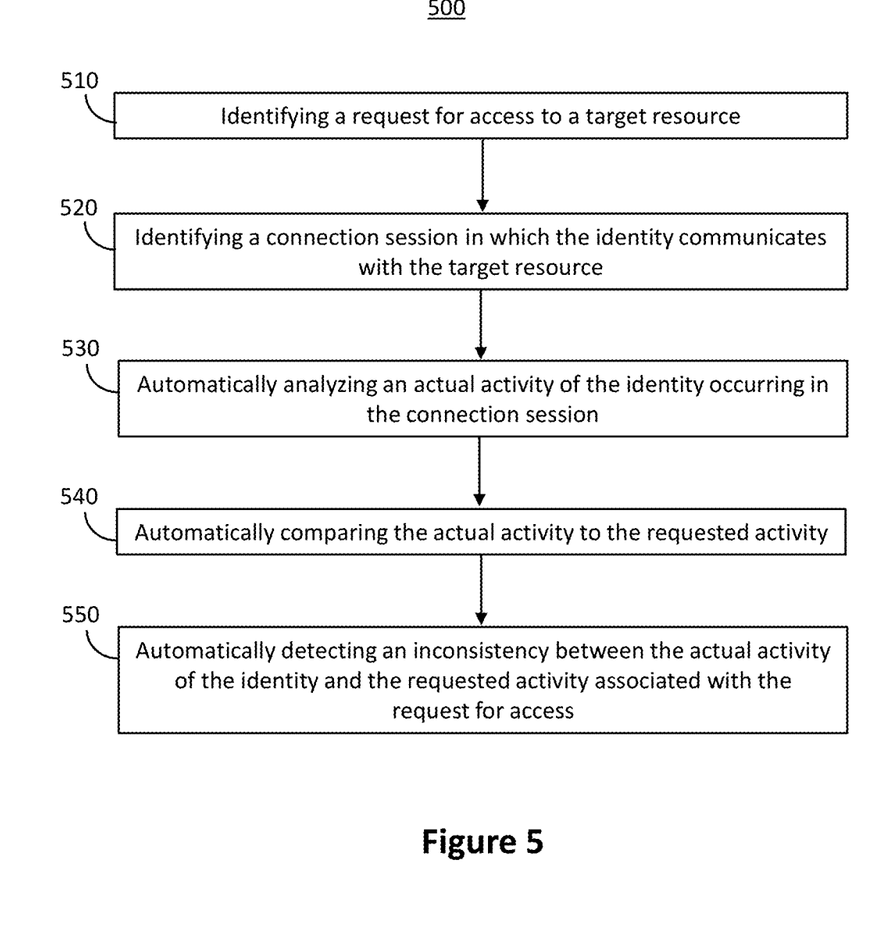
FIG. 5 is an example of a process for detecting inconsistencies of activities occurring over a connection session in accordance with disclosed embodiments.

FIG. 5 is a flowchart illustrating an example process 500 for detecting inconsistencies of activities occurring over a connection session, in accordance with disclosed embodiments. In accordance with above embodiments, process 500 may be implemented in system 100 as shown in FIG. 1, as well as in other systems and environments.

Process 500 may include an operation 510 of identifying a request for access to a target resource. This may involve, for example, identifying a request for access to a target resource by an identity, where the request is associated with a requested activity that requires privileged access. In system 100 of FIG. 1, for example, identity 20 may request access to target resource 150. In some embodiments, target resource may be access-restricted or privileged, such that access to it is not openly available to any requesting user. Access may be limited, for example, by a requirement for a ticket, an authentication or authorization process, or other techniques. The request by identity 20 may be associated with a requested activity to be performed at target resource 150. For example, the request from identity 20 may include a ticket generated by ticketing system 140, which specifies the requested activities that identity 20 wants to perform on target resource 150. In other embodiments, the request from identity 20 does not include the ticket, but rather the ticket (or its information) is stored elsewhere (e.g., at security system 110 or remotely). When identity 20 makes its request to access target resource 150, the ticket (or its information) may be accessed by security system 110.

Process 500 may also include an operation 520 of identifying a connection session in which the identity communicates with the target resource. For example, with reference to system 100 of FIG. 1, this may involve identity 20 communicating via an open session connection with target resource 150. As discussed above, the session connection may be implemented through various techniques, such as SSH, SSH tunnel, RDP, VPN, etc.

Process 500 may further include an operation 530 of automatically analyzing an actual activity of the identity occurring in the connection session. With reference to system 100 of FIG. 1, for example, identity 20 may perform or request specific activities in the connection session with target resource 150. Such activities may involve identity 20 attempting to read, write, overwrite, copy, download, modify, or otherwise access certain files from target resource 150. Similarly, the activities may involve target resource 150 attempting to read, write, overwrite, copy, download, modify, or otherwise access certain files identity 20 or another network resource. In various embodiments, analyzing this actual activity in the connection session may be performed by session monitoring subsystem 130.

Process 500 may further include an operation 540 of automatically comparing the actual activity to the requested activity. With reference to system 100 of FIG. 1, for example, this may involve security system 110 or session monitoring subsystem 130 comparing actual activity from the communications session between identity 20 and network resource 150 with the requested activity that identity 20 specified in its request for a ticket from ticketing system 140. As discussed above, the requested activities specified by identity 20 may be stored by or available to session analyzing subsystem 120. Further, session monitoring subsystem 130 may monitor (in real-time or historically) the actual communications activity of identity 20 and target resource 150. The requested activities from identity 20 may be identified, for example, through the interfaces discussed above in connection with FIGS. 2 and 3. Further, the comparison between the requested activity and actual activity may be performed through reference to a table, such as table 400 discussed in connection with FIG. 4. Through the comparison, it may be determined whether the requested activity of identity 20 corresponds to the actual activity in the communications session. As discussed above, administrators may tailor or customize the comparison process to define what deviation between requested and actual activity is permitted, and what deviation will trigger an inconsistency or anomaly.

Process 500 may also include an operation 550 of automatically detecting an inconsistency between the actual activity of the identity and the requested activity associated with the request for access. As discussed above, this may involve referencing a table, such as table 400 from FIG. 4, to compare the requested activity of identity 20 to the actual activity in the communication session between identity 20 and target resource 150. If the result of the comparison reveals that an inconsistency or anomaly has occurred, various types of remedial actions may be performed. As discussed above, examples of remediation operations include restricting or limiting the session activity between identity 20 and target resource 150, closing the session, commencing monitoring of identity 20 or target resource 150, investigating historical or concurrent activity of identity 20, issuing an authentication or other security prompt to identity 20, rotating or invalidating a password or other authentication credential of identity 20, or various other types of remediation operations. The remedial actions may further include performing analysis of identity 20 or the communications session to ascertain potentially malicious activity. This may involve, for example, applying behavioral analysis, machine learning algorithms, or artificial intelligence tools to look for patterns or indicia in the network connection (or other activity of identity 20) that is associated with potentially malicious activity.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for detecting inconsistencies of activities or operations occurring over a connection session, the operations comprising:
   identifying a connection session in which an identity communicates with a target resource, the connection session associated with an incident ticket, the incident ticket created by a ticketing system in response to a ticket request, the ticket request concerning an incident, the incident ticket indicating a specified activity or operation to perform;
   automatically determining an activity or operation requested during the connection session, at least in part by monitoring the communication during the session between the identity and the target resource;
   automatically comparing the requested activity or operation to the specified activity or operation to determine whether the requested activity or operation complies with the specified activity or operation;
   automatically detecting, based on the determination, an inconsistency between the requested activity or operation and the specified activity or operation; and
   in response to the detection of the inconsistency, performing a remediation operation.

2. The non-transitory computer readable medium of claim 1, wherein the connection session is established in response to receiving a request for access to the target resource and the incident ticket, the request for access including the incident ticket.

3. The non-transitory computer readable medium of claim 1, wherein the connection session is established in response to receiving a request for access to the target resource and the incident ticket, the request for access not including the incident ticket.

4. The non-transitory computer readable medium of claim 1, wherein the remediation operation includes at least one of:
   triggering an alert identifying the requested activity or operation, or identifying the detected inconsistency;
   performing a control operation regarding the requested activity or operation, the identity, or the connection session.

5. The non-transitory computer readable medium of claim 1, wherein the remediation operation includes invoking an investigation operation with respect to at least one of the connection session and the identity.

6. The non-transitory computer readable medium of claim 1, wherein the remediation operation includes rotating a password associated with at least one of the identity and the target resource.

7. The non-transitory computer readable medium of claim 1, wherein the operations further comprise receiving the ticket request.

8. The non-transitory computer readable medium of claim 1, wherein the operations further comprise establishing the connection session with the target resource.

9. The non-transitory computer readable medium of claim 1, wherein the operations further comprise granting privileged access over the connection session to the target resource.

10. The non-transitory computer readable medium of claim 1, wherein the operations further comprise determining whether the inconsistency includes an indicia of a potentially malicious activity.

11. The non-transitory computer readable medium of claim 1, wherein the ticket request is indicative of at least one of:
   a reason for a request for access to the target resource;
   a requested type of operation at the target resource;
   an identity of a requested service associated with the target resource; and
   an identity of a required hardware component associated with the target resource.

12. The non-transitory computer readable medium of claim 1, wherein the automatically determining is performed at a different location than the target resource.

13. The non-transitory computer readable medium of claim 1, wherein:
   the requested activity or operation comprises a requested command; and
   the specified activity or operation comprises a specified command.

14. The non-transitory computer readable medium of claim 1, wherein:
monitoring the communication comprises intercepting communications between the identity and the target resource.

15. The non-transitory computer readable medium of claim 1, wherein:
monitoring the communication comprises receiving, during the connection session, reports of communications between the identity and the target resource.

16. A computer-implemented method, executable by a processor of a computing system, for detecting inconsistencies of activities or operations occurring over a connection session, the method comprising:
identifying a connection session in which an identity communicates with a target resource, the connection session associated with an incident ticket, the incident ticket created by a ticketing system in response to a ticket request, the ticket request concerning an incident, the incident ticket indicating a specified activity or operation to perform;
automatically determining an activity or operation requested during the connection session, at least in part by monitoring the communication during the session between the identity and the target resource;
automatically comparing the requested activity or operation to the specified activity or operation to determine whether the requested activity or operation complies with the specified activity or operation;
automatically detecting, based on the determination, an inconsistency between the requested activity or operation and the specified activity or operation; and
in response to the detection of the inconsistency, performing a remediation operation.

17. The computer-implemented method of claim 16, wherein the connection session is established in response to receiving a request for access to the target resource and the incident ticket, the request for access including the incident ticket.

18. The computer-implemented method of claim 16, wherein the connection session is established in response to receiving a request for access to the target resource and the incident ticket, the request for access not including the incident ticket.

19. The computer-implemented method of claim 16, wherein the remediation operation includes at least one of:
triggering an alert identifying the requested activity or operation, or identifying the detected inconsistency;
performing a control operation regarding the requested activity or operation, the identity, or the connection session.

20. The computer-implemented method of claim 16, wherein the remediation operation includes invoking an investigation operation with respect to at least one of the connection session and the identity.

21. The computer-implemented method of claim 16, wherein the remediation operation includes rotating a password associated with at least one of the identity and the target resource.

22. The computer-implemented method of claim 16, further comprising receiving the ticket request.

23. The computer-implemented method of claim 16, further comprising establishing the connection session with the target resource.

24. The computer-implemented method of claim 16, further comprising granting privileged access over the connection session to the target resource.

25. The computer-implemented method of claim 16, further comprising determining whether the inconsistency includes an indicia of a potentially malicious activity.

26. The computer-implemented method of claim 16, wherein the ticket request is indicative of at least one of:
a reason for a request for access to the target resource;
a requested type of operation at the target resource;
an identity of a requested service associated with the target resource; and
an identity of a required hardware component associated with the target resource.

27. The computer-implemented method of claim 16, wherein the automatically determining is performed at a different location than the target resource.

\* \* \* \* \*